United States Patent
Le Chevalier et al.

(10) Patent No.: US 10,963,937 B1
(45) Date of Patent: Mar. 30, 2021

(54) ONLINE ECOMMERCE IN AUGMENTED REALITY PLATFORMS

(71) Applicant: Wells Fargo Bank, N.A., San Francisco, CA (US)

(72) Inventors: Vincent Le Chevalier, San Jose, CA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 648 days.

(21) Appl. No.: 15/652,764

(22) Filed: Jul. 18, 2017

(51) Int. Cl.
    *G06Q 30/00*     (2012.01)
    *G06Q 30/06*     (2012.01)

(52) U.S. Cl.
    CPC ..... *G06Q 30/0623* (2013.01); *G06Q 30/0609* (2013.01); *G06Q 30/0641* (2013.01)

(58) Field of Classification Search
    CPC ................. G06Q 30/0601–0645; G06Q 30/08
    USPC ................................................ 705/26.1–27.2
    See application file for complete search history.

(56) References Cited

U.S. PATENT DOCUMENTS

| | | | |
|---|---|---|---|
| 9,336,541 B2* | 5/2016 | Pugazhendhi | G06Q 30/0281 |
| 9,734,634 B1* | 8/2017 | Mott | G06T 19/006 |
| 9,875,504 B1* | 1/2018 | Roe | G06Q 30/0643 |
| 10,235,810 B2* | 3/2019 | Morrison | G06T 19/006 |
| 2003/0041326 A1* | 2/2003 | Novak | H04L 29/06027 |
| | | | 725/25 |
| 2006/0173773 A1* | 8/2006 | Ettinger, Jr. | G06F 3/147 |
| | | | 345/633 |
| 2007/0229547 A1* | 10/2007 | Kidalka | G06T 19/20 |
| | | | 345/653 |
| 2009/0012878 A1* | 1/2009 | Tedesco | G06Q 30/0643 |
| | | | 705/27.2 |
| 2009/0187485 A1* | 7/2009 | Loui | G06Q 30/0225 |
| | | | 705/14.26 |
| 2012/0233032 A1* | 9/2012 | Calman | G06Q 30/02 |
| | | | 705/27.1 |

(Continued)

OTHER PUBLICATIONS

Karakaya, F., & Charlton, E. T. (2001). Electronic commerce: Current and future practices. Managerial Finance, 27(7), 42-53. (Year: 2001).*

*Primary Examiner* — Resha Desai
*Assistant Examiner* — Kennedy Gibson-Wynn
(74) *Attorney, Agent, or Firm* — Walter Haverfield LLP; James J. Pingor (57) ABSTRACT

A system and computer-readable storage medium perform a method of augmenting eCommerce with quasi in-person discovery facilitated by an eCommerce platform that: (i) presents, to a buyer on a buyer user interface (UI) provided by buyer user device(s), an eCommerce opportunity associated with a tangible object that is offered by a seller via a seller UI; (ii) provides an interactive control affordance on the buyer UI that enables the buyer to select for presentation another visual aspect of the tangible object that is provided by the seller UI; (iii) recognizes, by an augmented reality component of the buyer user device(s), a discovered attribute of the other visual aspect of the tangible object; (iv) accesses information related to the discovered attribute that is pertinent to the eCommerce opportunity; and (v) presents, to the buyer on the buyer user interface, an augmented reality informational item associated with the discovered attribute.

15 Claims, 5 Drawing Sheets

(56) References Cited

U.S. PATENT DOCUMENTS

| | | | |
|---|---|---|---|
| 2013/0151352 A1* | 6/2013 | Tsai | G06Q 30/0623 705/41 |
| 2013/0211945 A1* | 8/2013 | Po-Ching | G06Q 30/02 705/14.1 |
| 2014/0100993 A1* | 4/2014 | Farmer | G06Q 30/0255 705/14.53 |
| 2014/0100997 A1* | 4/2014 | Mayerle | G06Q 30/0643 705/27.2 |
| 2016/0189268 A1* | 6/2016 | Gandhi | G06Q 30/0643 |
| 2016/0375360 A1* | 12/2016 | Poisner | G06Q 30/0623 705/26.61 |
| 2017/0039611 A1* | 2/2017 | Jing | G06Q 30/0609 |

* cited by examiner

ONLINE ECOMMERCE IN AUGMENTED REALITY PLATFORMS

BACKGROUND

The present application relates to information handling systems, and more particularly to an information handling system that provides an electronic platform that facilitates two-party eCommerce transactions.

Online eCommerce platforms, such as eBay, Amazon or Craigslist, have become the destination of choice for consumers, distributors and brands to purchase and sell new or used products online of any price and type. After the publishing by the eCommerce platform of the seller's product description and pictures, the prospective buyer is making a purchase decision based on the posted description of that product. The prospective buyer is effectively limited to the information and views supplied by the seller. The prospective buyer cannot discover via the eCommerce platform the actual condition and features of that product.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems are provided herein for enhancing an eCommerce platform with interactive discovery and augmented reality. The buyer can intuitively interact with representations of a tangible object related to an eCommerce opportunity in a way that enable additional discovery or provide confirmation of the representation as being the actual condition of the tangible object. Augmented reality devices or online services are incorporated into an online marketplace to transform how online-Commerce is being experienced. The augmented reality capability creates an opportunity for new added-value services. By providing more descriptive and comparative detailed information to the prospective buyer, the buyer can more confidently engage in a transaction. Augmented information obtained independent of what the seller is providing can further corroborate or provide context for what is discovered by the buyer. The buyer is thus more likely to pursue and complete a fair transaction for a particular product of interest by knowing more before completing the purchase. The seller can benefit by knowing more about a prospective buyer. The seller can also benefit by having a higher likelihood of a satisfied buyer who will not pursue a refund or other redress.

In one or more embodiments, the present disclosure provides a method of augmenting eCommerce with quasi in-person discovery. The method includes presenting, to a buyer on a buyer user interface provided by at least one buyer user device, an eCommerce opportunity associated with a tangible object that is offered by a seller via a seller user device. The method includes providing an interactive control affordance on the user interface that enables the buyer to select for presentation another visual aspect of the tangible object that is provided by the seller user device. The method includes recognizing, by an augmented reality component of the at least one buyer user device, a discovered attribute of the other visual aspect of the tangible object. The method includes accessing information related to the discovered attribute that is pertinent to the eCommerce opportunity. The method includes presenting, to the buyer on the user interface, an augmented reality informational item associated with the discovered attribute.

In one or more embodiments, the present disclosure provides a system that includes a data catalog that presents, to a buyer on a buyer user interface provided by at least one buyer user device, an eCommerce opportunity associated with a tangible object that is offered by a seller via a seller user device. A data visualization and content distribution platform provides an interactive control affordance on the user interface that enables the buyer to select for presentation another visual aspect of the tangible object that is provided by the seller user device. An augmented reality component: (i) recognizes a discovered attribute of the other visual aspect of the tangible object; and (ii) accesses information related to the discovered attribute that is pertinent to the eCommerce opportunity. The data visualization and content distribution platform presents, to the buyer on the buyer user interface, an augmented reality informational item associated with the discovered attribute.

In one or more embodiments, the present disclosure provides a method of augmenting eCommerce with quasi in-person discovery. In one or more embodiment, the method includes presenting, to a buyer on a buyer user interface provided by at least one buyer user device, an eCommerce opportunity associated with a tangible object that is offered by a seller via a seller user device. The method includes providing an interactive control affordance on the user interface that enables the buyer to select for presentation another visual aspect of the tangible object that is provided by the seller user device. The method includes recognizing, by an augmented reality component of the at least one buyer user device, a discovered attribute of the other visual aspect of the tangible object. The method includes accessing information related to the discovered attribute that is pertinent to the eCommerce opportunity. The method includes presenting, to the buyer on the buyer user interface, an augmented reality informational item associated with the discovered attribute.

In one or more embodiments, the present disclosure provides a computer-readable storage medium including computer-executable instructions. When executed via a processing unit on a computer performs acts, the instructions cause processing unit to perform the above-described method.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

A system and computer-readable storage medium perform a method of augmenting eCommerce with quasi in-person discovery facilitated by an eCommerce platform. The eCommerce platform: (i) presents, to a buyer on a buyer user interface (UI) provided by buyer user device(s), an eCommerce opportunity associated with a tangible object that is offered by a seller via a seller UI; (ii) provides an interactive control affordance on the buyer UI that enables the buyer to select for presentation another visual aspect of the tangible object that is provided by the seller UI; (iii) recognizes, by an augmented reality component of the buyer user device(s), a discovered attribute of the other visual aspect of the tangible object; (iv) accesses information related to the discovered attribute that is pertinent to the eCommerce opportunity; and (v) presents, to the buyer on the buyer user interface, an augmented reality informational item associated with the discovered attribute.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure. As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Figure 1:
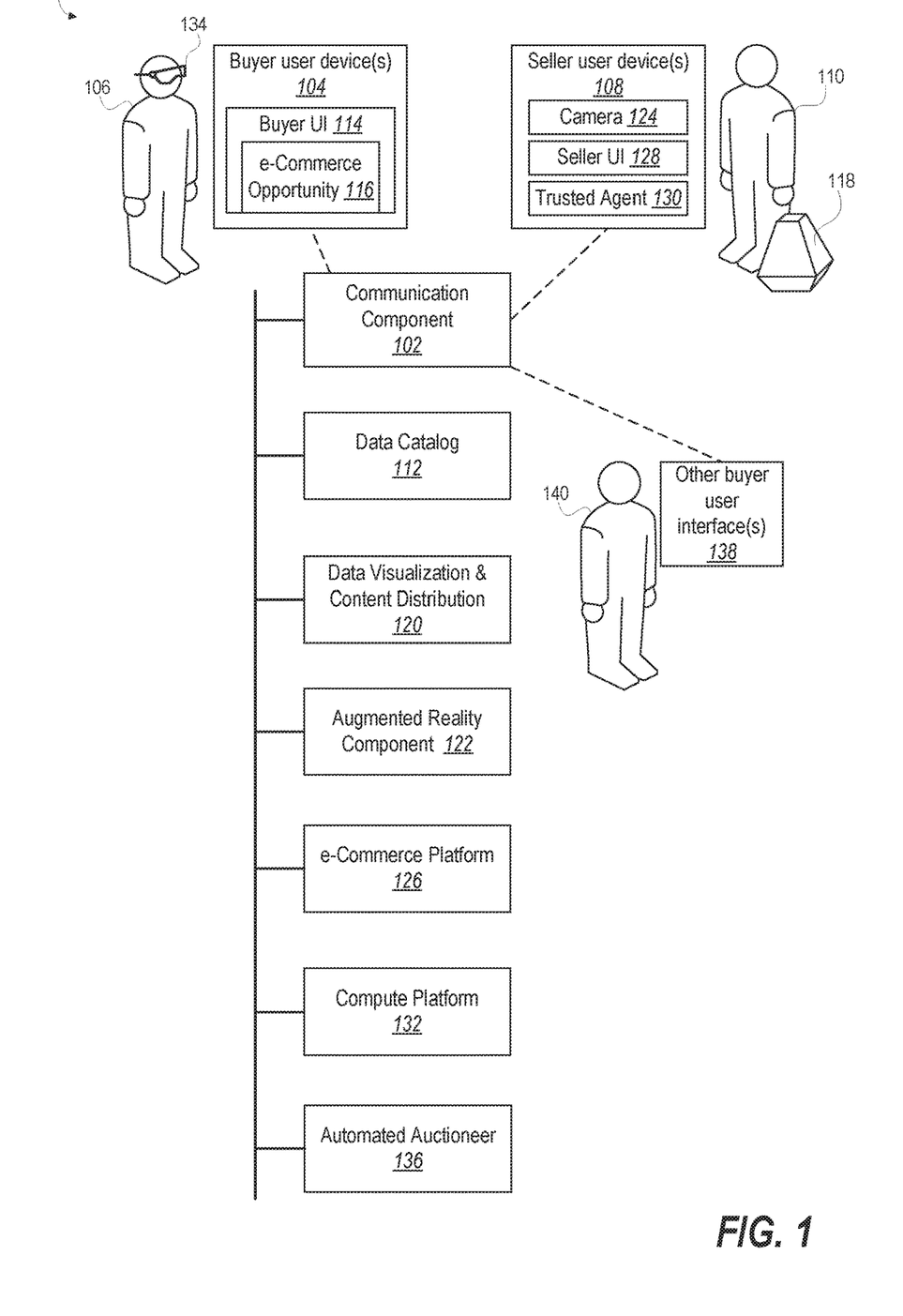
FIG. 1 illustrates a block diagram of a system for augmenting eCommerce with quasi in-person discovery, according to one or more embodiments.

FIG. 1 illustrates a system 100 according to aspects of the present innovation. The system 100 includes a communication component 102 that can communicate with buyer user device(s) 104 of buyer(s) 106. The communication component 102 can also communicate with seller user device(s) 108 of seller(s) 110. Depending on a particular eCommerce opportunity, a buyer 104 can become a seller 110 and a seller 110 can become a buyer 104. A data catalog 112 presents, to a buyer 106 on the buyer user interface 114 presented on the buyer user device(s) 104, an eCommerce opportunity 116 associated with a tangible object 118 that is offered by the seller 110 via the seller user device 108.

The system 100 includes a data visualization and content distribution platform 120 that provides an interactive control affordance on the buyer user interface 114. The interactive control affordance enables the buyer 106 to select for presentation another visual aspect of the tangible object 118. The visual aspect can include changing an operating state or configuration of the tangible object 118. The visual aspect can be provided by the seller user device 108. An augmented reality component 122 that: (i) recognizes a discovered attribute of the other visual aspect of the tangible object; and (ii) accesses information related to the discovered attribute that is pertinent to the eCommerce opportunity 116. The data visualization and content distribution platform 120 presents, to the buyer on the buyer user interface, an augmented reality informational item associated with the discovered attribute.

The communication component 102: (i) receives a user input to the interactive control affordance via the buyer user device 104; (ii) communicates to the seller user device 108 a requested visual aspect of the tangible object 118; and (iii) receives an output from a camera 124 of the seller user device 108 that is directed toward the requested visual aspect including the discovered attribute.

In one or more embodiments, the communication component 102 provides the interactive control affordance on the buyer interface 114 that enables the buyer 106 to select for presentation another visual aspect of the tangible object 118 that is provided by the seller user device 108. The system 100 includes an eCommerce platform 126 that: directs, via the communication component 102, the seller via seller user interface 128 to operate the seller user device 108 to provide the requested visual aspect of a selected one of: (i) a video stream; and (ii) an images. The eCommerce platform 126 stores the requested visual aspect. In response to receiving activation of the interactive control affordance, the eCommerce platform 126 replays a requested portion of the stored visual aspect to the buyer 106. The eCommerce platform 126 can certify to the buyer that the requested aspect was obtained through the seller user device 108. In one or more embodiments, a trusted agent 130 that is coupled to the seller user device 108: (i) provides the requested visual aspect; and (ii) certifies that the requested visual aspect is a directed live recording by the seller user device 108 based at least in part upon corroboration performed by the trusted agent 130.

In one or more embodiments, the eCommerce platform 126 presents on the buyer user interface 114 one or more attributes of the seller 110 that are related to credibility to effect a transaction. The eCommerce platform 126 presents on the seller user interface 126 one or more attributes of the buyer that are related to credibility to effect a transaction In one or more embodiments, the system 100 can include a compute platform 132 that: (i) receives the requested visual aspect from the trusted agent 130 coupled to the seller user device 108; (ii) renders two dimensional image content into a three-dimensional model; and (iii) provides the three-dimensional model to the data visualization and content distribution platform 120 that enables the buyer user device 104 to manipulate the three-dimensional model in vantage point and zoom.

The eCommerce platform 126 determines whether the buyer user interface 114 of the buyer 106 includes an augmented reality heads up display (HUD) 134. In response to determining that the buyer user interface 114 does include the augmented reality HUD 134, the eCommerce platform 126 presents the discovered attribute via a first user interface device 114 to indicate sourcing by the seller. The eCommerce platform 126 presents the augmented reality informational item via a second user interface device, such as the HUD 134 through which the first user interface device 114 is viewed. In response to determining that the buyer user interface 114 does not include the augmented reality HUD 134, the eCommerce platform 126 presents the augmented reality informational item with a first annotation to indicate a trusted source other than the seller. The eCommerce platform 126 presents the discovered attribute with a second annotation to indicate sourcing by the seller. Thereby, in both instances the buyer 106 has an intuitive understanding of the different sources of information and thus a different degree of credibility.

In one or more embodiments, the eCommerce platform 126 presents on the buyer user interface 114 one or more attributes of the seller 110 that are related to credibility to effect a transaction. The eCommerce platform 126 presents on the seller user interface 128 one or more attributes of the buyer 106 that are related to credibility to effect a transaction.

In one or more embodiments, the eCommerce platform 126 determines whether the eCommerce opportunity comprises a selected one of: (i) a single buyer negotiation; and (ii) a multiple buyer auction. In response to determining that the eCommerce opportunity is a single buyer negotiation, the eCommerce platform 126 presents on the buyer user interface 114 an offered sales price by the seller 110. The eCommerce platform 126 provides a control affordance on the buyer user interface 114 to counteroffer a sale price by the buyer 106 to the seller 110. The eCommerce platform 126 presents any counteroffer by the buyer 106 to a selected one of: (i) an automated auctioneer 136 that is enabled to adjust a sales price; and (ii) the seller user interface 128 for acceptance by the seller 110.

In response to determining that the eCommerce opportunity is a multiple buyer auction, the eCommerce platform 126 present a current auction bid price on the buyer user interface 114 and on at least one other user interface 138 of other buyers 140. The eCommerce platform 126 updates the current auction bid price based upon an input from either the buyer user interface 114 or from another user interface. The eCommerce platform 126 concludes the auction in response to a selected one of: (i) the automated auctioneer 136 closing the bidding; and (ii) an input received via the seller user interface 128.

Figure 2:
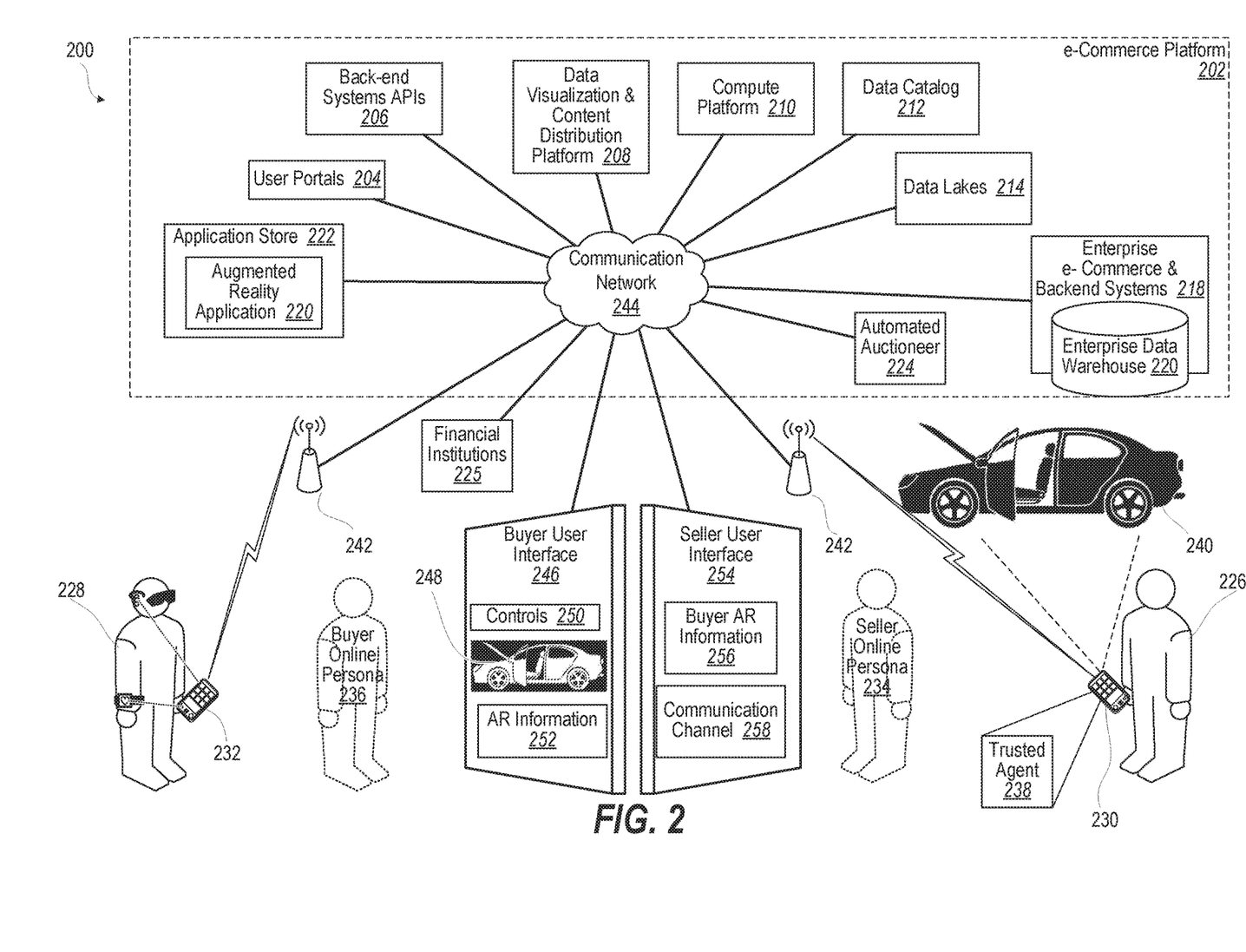
FIG. 2 illustrates a block diagram of an environment for augmenting eCommerce with quasi in-person discovery, according to one or more embodiments.

FIG. 2 illustrates an exemplary environment 200 according to aspects of the present innovation. The environment 200 provides an online eCommerce in augmented reality platform (e-Commerce platform 202). Back-end systems include all the components necessary to support the augmented reality applications, including user's portal 204, back-end system application programming interfaces (APIs) 206, data visualization and content distribution platform 208, compute platforms 210, content catalog database ("data catalog" 212) and include a set of secured encrypted APIs to communicate and interface with 3rd party service provider systems to import data into data lakes 214 as described herein. e-Commerce platform 202 also includes an enterprise e-Commerce & backend systems 216 that utilize an enterprise data warehouse 218.

An augmented reality application 220 provided by an application store 222 is downloaded to the user's connected mobile device (buyer user devices 220). Services are available when the augmented reality application 220 is running. The user's portals 204 provide a gateway (proxy) to backend APIs 206 as requested by augmented reality applications Back-end systems APIs 206 service calls for interacting with back-end systems 218. Examples of such services include user accounts, access rights, marketing, finance, legal, eCommerce, among others, per domain of applications.

Compute platforms 210 handle the generation of the data files and playlist that augmented reality applications depend on. Generated data files are pushed to the data visualization and content distribution platform 208 where the data files can be consumed by the augmented reality applications 220 on connected devices 230, 232. For example, the compute platforms 210 can run on a regular time intervals to update data files and playlist.

Data catalog 212 can utilize a dataset catalog and metadata catalog API. Data catalog 212 records any changes made to the data and can enforce data access rules that manage rules, encryption and decryption of data.

Data lakes 214 capture all analytically useful datasets onto one single infrastructure. Data lakes 214 contains collections of product catalog domain specific categories and items, such as cars, electronics, tools, clothes, toys and so on, organized by brands, categories, merchant data, user data, third-party data, and others.

Data visualization and content distribution (DVCD) platform 208 handles content data requests and delivery to the augmented reality applications 220, such as three-dimensional (3D) files for representing a listed item. DVCD platform 208 can include support for data visualization based on mobile device types and other display formats. DVCD platform 208 can create and send temporary uniform resource locators (URLs) to the user's mobile phone. DVCD platform 208 can push asset playlists to a distribution server such as application store 222.

Enterprise eCommerce and backend systems 218 contains all typical enterprise ecommerce and backend systems includes enterprise data warehouse 220. An automated auctioneer 224 can be empowered to step in for a seller 226 in providing additional interactive information and negotiating the transaction or auction. The eCommerce platform 202 can have established channels with financial institutions 225 to conclude sales.

The eCommerce platform 202 facilitates a transaction between the seller 226 and a buyer 228. In an exemplary embodiment, both seller 226 and a buyer 228 remotely interact via their respective user devices 230, 232. The eCommerce platform 202 can represent buyer and seller online personas 234, 236 that convey information that one would legitimately require or reasonably obtain in face-to-face bargaining. To avoid spoofing of a legitimate seller 226, a trust agent 238 can operate on the seller user device 230 such that the taking of images of a tangible object 240 can be corroborated as having been obtained live. The trusted agent 238 can include biometric validation of an authorized user, can obtain geographic location information, identification of the seller user device 230, etc.

In an exemplary embodiment, each user device 230, 232 connects to a node 242, such as Wi-Fi, wide area network (WAN), etc., to reach a communication network 244 that couples the other entities of the eCommerce platform 202. In one or more embodiments, the user device 230, 232 can form an ad hoc communication or utilize the communication network 244 during a face-to-face negotiation, benefiting from the reality augmentation and facilitated financial transactional aspects of the eCommerce platform 202.

A buyer user interface 246 provided by the buyer user device(s) 232 can present an interactive representation 248 of the tangible object 240. Control affordances 250 allow the buyer 228 to interact with the interactive representation 248, the seller 226, or the automated auctioneer 224. Augmented reality information 252 is presented that enhances the buyer's understanding of the tangible object 240 or other items related to the possible transaction. A seller user interface 254 provides augmented reality information 256 regarding the buyer 228. A communication channel 258 facilitates interactions with the potential buyer 228.

In one or more embodiments, a registered user of an augmented reality platform for online eCommerce can be a seller, a buyer, or both. Once registered, the seller accesses an online portal to post a description of a particular product for sale. The description can include text, visual and other descriptive content of the posted item along with the individual properties and rules that govern its sale. Examples of sales governance include: (i) a pricing model, such as auction, asking price or volume discount; (ii) availability of how long this posted product is available for sale; (iii) an inventory of how many items are available; (iv) shipment provisions such as cost of shipping; and (v) other types of information that the seller is providing to its potential buyers.

Once uploaded, the augmented reality platform back-end systems 218 process the uploaded content, such as the product for sale description, pictures or video to correlate that content to similar or related products in its database, as well as third party partners, to provide for comparison and additional information which are relevant to the item being posted.

For instance, a text description or set of pictures used to show a particular item are processed individually against comparable description or pictures of the same or similar products, providing for additional descriptive information, comparison about the particular condition of the posted item as well as suggestions or recommendations for alternate products.

For example, the "look and feel" of the posted item, its "operational" status, "design", "mechanical" properties, "suggested resale value", "reviews", "financing options" or any other information of interest represent categorized content that gets computed from the existing platform product database or acquired from 3rd party partners in order to better characterize the item offered by the Seller by augmenting the information available to the Seller for making a purchase decision.

In addition, the mobile application, when running in augmented reality mode, simulates certain aspects of interacting with a real physical product by implementing a display navigation mode that reconstruct a 3D visualization of the listed product based on its descriptive pictures, such as top, bottom, side right, left and so on. These set of pictures are either uploaded by the Seller or are identified by the Platform correlation systems to complement the uploaded ones.

For instance, moving the user's connected device running the augmented reality application forward translates into zooming into the posted pictures of the listed product, providing more details. Similarly, moving backward translates into zooming out of the posted pictures of the listed product, providing more perspective. In addition, holding the connected device and rotating it along its 3-axis motion sensor detection, such as X, Y, Z or digital compass, creates a virtual space that the mobile application computes to provide the user with the actual posted side, top and bottom pictures, as available from the Seller or as computed from similar products hosted by the platform catalog product database.

The augmented information compiled by the platform back-end systems, such as "look and feel" or "design" see above, and presented to the user in real-time within the augmented reality application and gets updated based on the user navigation in this virtual space.

For instance, the information related to a specific side, feature, or aspect of the listed product gets more relevant to the user depending on what the user decides to focus on, while using the augmented reality application, providing different level of perspective based on zoom in or out decisions.

In one or more embodiments, an online eCommerce platform can host multiple product for sale as well as multiple sales services. For example, the platform back-end systems and mobile augmented reality applications can support a number of different types of customer engagement, including "single buyer" mode, "buyer to seller" and "seller to multiple buyers", among others as described herein.

Figure 3:
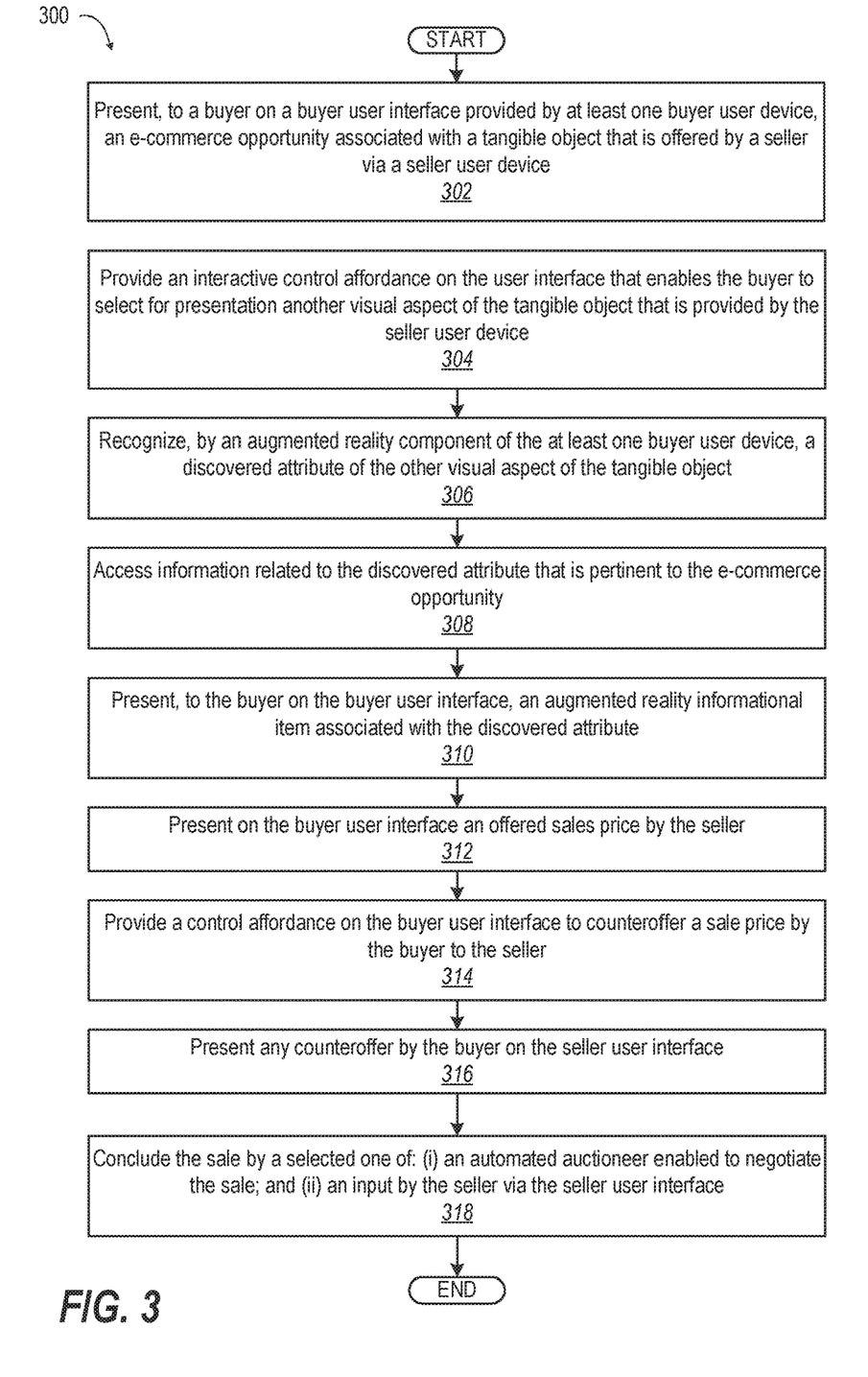
FIG. 3 illustrates a flow diagram of a method of augmented reality eCommerce, according to one or more embodiments.

FIG. 3 illustrates a method 300 of augmenting eCommerce with quasi in-person discovery. In one or more embodiments, the method 300 includes presenting, to a buyer on a buyer user interface provided by an augmented reality application on at least one buyer user device, an eCommerce opportunity associated with a tangible object that is offered by a seller via a seller user device (block 302). Method 300 providing an interactive control affordance on the user interface that enables the buyer to select for presentation another visual aspect of the tangible object that is provided by the seller user device (block 304). Method 300 includes recognizing, by an augmented reality application of the at least one buyer user device, a discovered attribute of the other visual aspect of the tangible object (block 306). Information related to the discovered attribute that is pertinent to the eCommerce opportunity is accessed (block 308). Method 300 includes presenting, to the buyer on the buyer user interface, an augmented reality informational item associated with the discovered attribute (block 310). Method 300 includes presenting on the buyer user interface an offered sales price by the seller (block 312). Method 300 includes providing a control affordance on the buyer user interface to counteroffer a sale price by the buyer to the seller (block 314). Method 300 includes presenting any counteroffer by the buyer on the seller user interface (block 316). Method 300 includes concluding the sale by a selected one of: (i) an automated auctioneer enabled to negotiate the sale; and (ii) an input by the seller via the seller user interface (block 318). Then method 300 ends.

In one or more embodiments, method 300 includes providing the interactive control affordance by: (i) communicating to the seller user device a requested visual aspect of the tangible object; and (ii) receiving an output from a camera of the seller user device that is directed toward the requested visual aspect including the discovered attribute.

In one or more embodiments, method 300 includes providing the interactive control affordance on the user interface that enables the buyer to select for presentation another visual aspect of the tangible object. In particular, method 300 includes: (i) directing, by an eCommerce platform, the seller to operate the seller user device to provide the requested visual aspect of a selected one of: (a) a video stream; and (b) an images; (ii) storing the requested visual aspect; and (iii) in response to receiving activation of the interactive control affordance: (a) replaying a requested portion of the stored visual aspect to the buyer, and (b)

certifying to the buyer that the requested aspect was obtained through the seller user device.

In one or more embodiments, method 300 includes: (i) receiving the requested visual aspect from a trusted agent coupled to the seller user device; and (ii) certifying that the requested visual aspect is a directed live recording by the seller user device based at least in part upon corroboration performed by the trusted agent.

In one or more embodiments, method 300 includes: (i) receiving the requested visual aspect from a trusted agent coupled to the seller user device; (ii) rendering two dimensional image content into a three-dimensional model; and (iii) enabling the buyer user device to manipulate the three-dimensional model in vantage point and zoom.

In one or more embodiments, method 300 includes: (i) presenting the augmented reality informational item with a first annotation to indicate a trusted source other than the seller; and (ii) presenting the discovered attribute with a second annotation to indicate sourcing by the seller.

In one or more embodiments, method 300 includes: (i) presenting the discovered attribute via a first user interface device to indicate sourcing by the seller; and (ii) presenting the augmented reality informational item via a second user interface device comprising a heads up display through which the first user interface device is viewed.

In one or more embodiments, method 300 includes: (i) presenting on the buyer user interface one or more attributes of the seller that are related to credibility to effect a transaction; and (ii) presenting on the seller user interface one or more attributes of the buyer that are related to credibility to effect a transaction In one or more embodiments, method 300 includes: (i) presenting a current auction bid price on the user interface of the buyer and on at least one other user interface of other buyers; (ii) updating the current auction bid price based upon an input from either the user interface of the at least one other user interface; and (iii) concluding the auction in response to an input via the seller user interface. In a particular embodiment, method 300 includes an automated auctioneer utility that responds to inquiries and auction bid prices submitted via the user interface of the buyer and the at least one other user interface of the other buyers.

Figure 4:
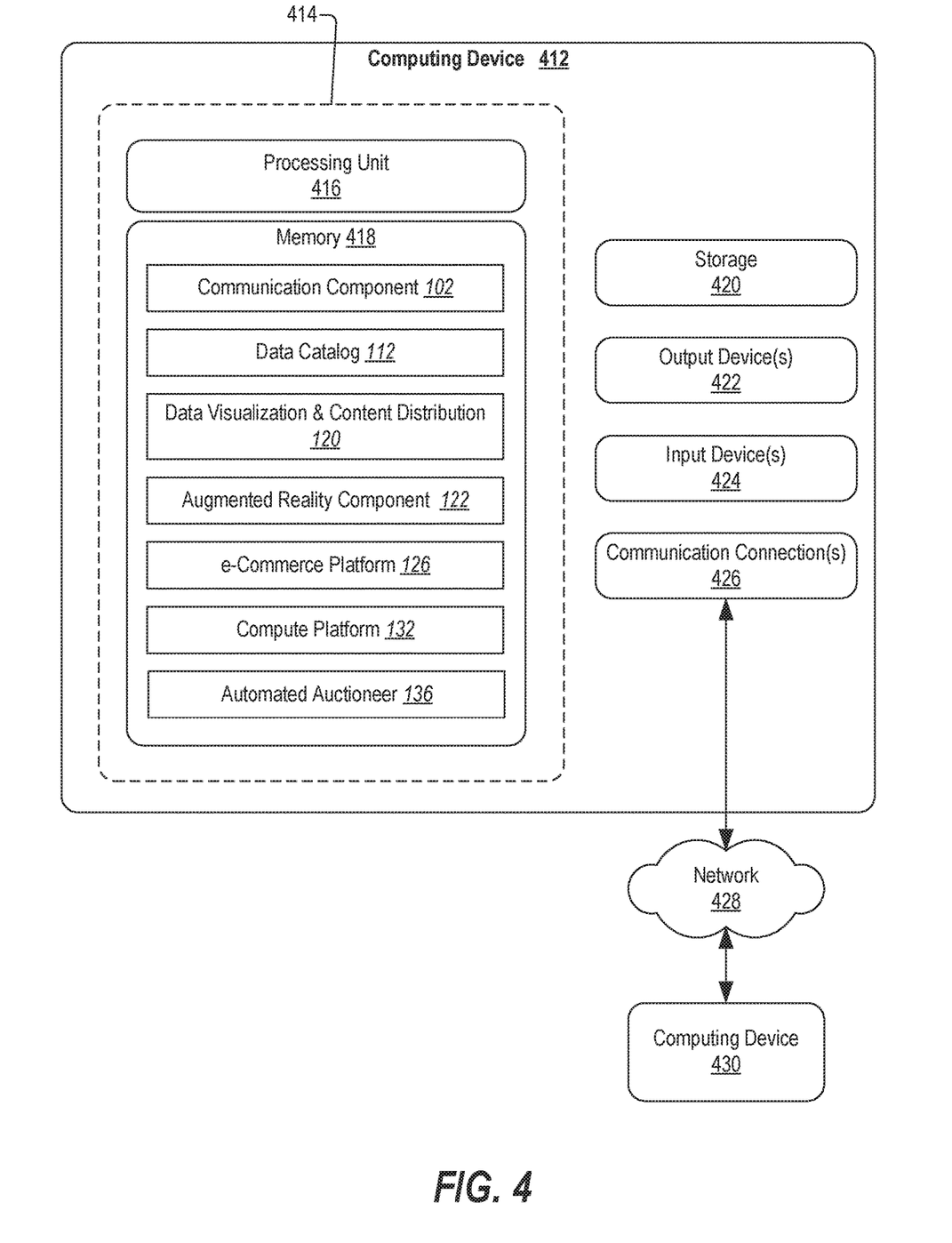
FIG. 4 illustrates a block diagram of a system having a computing device for performing augmented reality eCommerce, according to one or more embodiments.

FIG. 4 illustrates a system 400 including a computing device 412 configured to implement one or more embodiments provided herein. In one configuration, computing device 412 includes at least one processing unit 416 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other embodiments, device 412 includes additional features or functionality. For example, device 412 may include additional storage such as removable storage or non-removable storage, including, but not limited to, magnetic storage, optical storage, etc. Such additional storage is illustrated in FIG. 4 by storage 420. In one or more embodiments, computer readable instructions to implement one or more embodiments provided herein are in storage 420. Storage 420 may store other computer readable instructions to implement an operating system, an application program, etc. Computer readable instructions may be loaded in memory 418 for execution by processing unit 416, for example.

The term "computer readable media" as used herein includes computer storage media. Computer storage media includes volatile and nonvolatile, removable and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 412. Any such computer storage media is part of device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 412 includes input device(s) 424 such as keyboard, mouse, pen, voice input device, touch input device, infrared cameras, video input devices, or any other input device. Output device(s) 422 such as one or more displays, speakers, printers, or any other output device may be included with device 412. Input device(s) 424 and output device(s) 422 may be connected to device 412 via a wired connection, wireless connection, or any combination thereof. In one or more embodiments, an input device or an output device from another computing device may be used as input device(s) 424 or output device(s) 422 for computing device 412. Device 412 may include communication connection(s) 426 to facilitate communications via a network 428 with one or more other computing devices 430.

Certain functionalities of virtual financial continuity can be performed by software applications resident in memory 418, such as a communication component 102, data catalog 112, data visualization and content distribution 120, augmented reality component 122, eCommerce platform 126, compute platform 132, and automated auctioneer 136.

Figure 5:
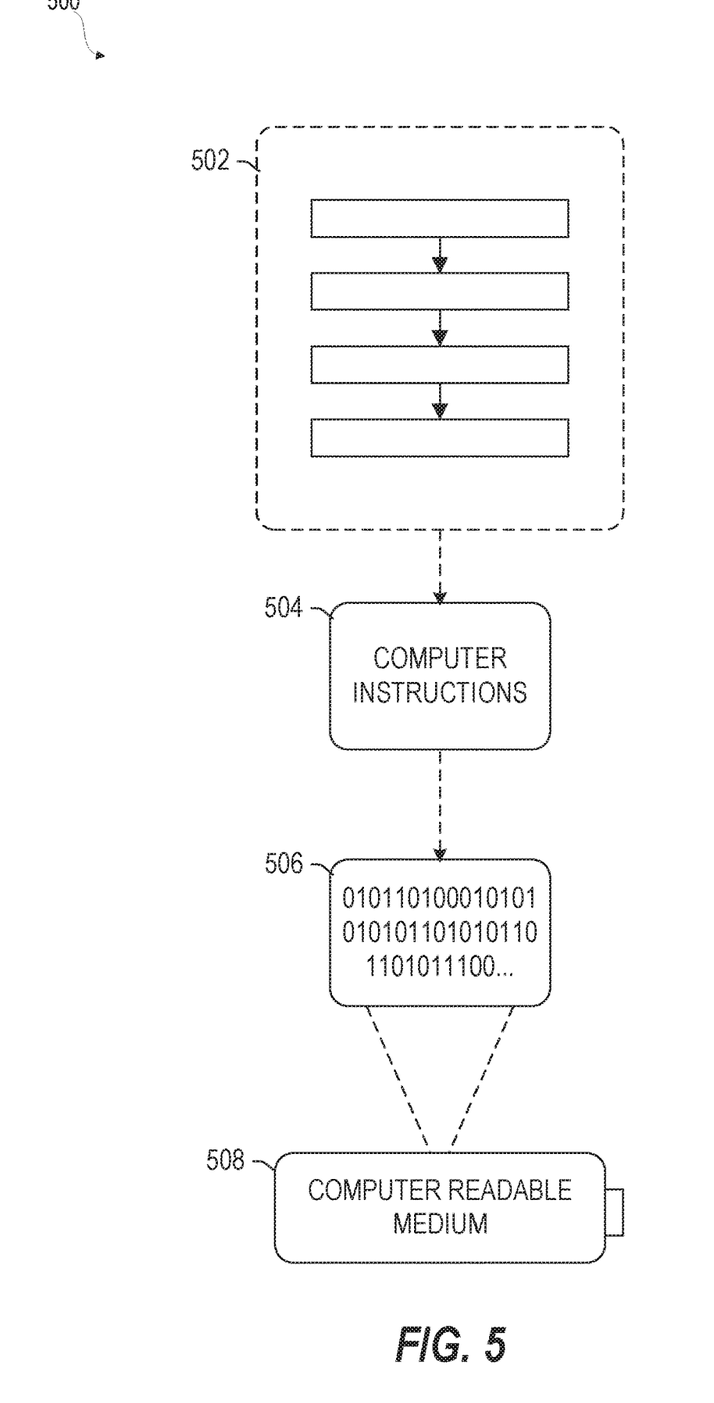
FIG. 5 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 504 may be configured to perform a method 502, such as method 300 of FIG. 3. In another embodiment, the processor-executable instructions 504 may be configured to implement a system, such as the system 100 of FIG. 1. Many such computer-readable media may be devised by those of ordinary skill in the art that are configured to operate in accordance with the techniques presented herein.

Because the online eCommerce platform is hosting the product for sale, the services that run on the platform back-end systems and mobile augmented reality applications are supporting a number of different types of customer engagement, including "single buyer" mode, "buyer to seller" and "seller to multiple buyers", among others as described herein.

The Single Buyer use case is a prospective buyer that interested in a particular product as posted by the online marketplace augmented reality platform. Buyer is a registered user of online marketplace augmented reality application platform. Seller has previously posted the product item description on the platform. Platform has published item as part at its overall product catalog. Buyer runs an online marketplace augmented reality application and logs into the platform using the buyer's account profile information. Buyer browses catalog of published items using its mobile augmented reality application. Buyer selects a particular product of interest and clicks on the augmented reality icon within the application. By switching to augmented reality, the Buyer looks at the individual pictures of the posted item augmented by the additional information compiled by the platform and displayed by the mobile augmented reality application. When in augmented reality mode, the mobile application simulates the interaction of the physical product in the digital domain. The compiled information displayed by the application is organized based on the "look and feel" of the device.

For one example, the look and feel of the device can be left, right, top, bottom or inside (if the device opens). For another example, the look and feel of the device can be an "operational" status, such as turning the device on, run a specific application on the device (if the device runs applications). For an additional example, the look and feel of the device can be a "design" of the device, such as color or specific ornamental features. For a further example, the look and feel of the device can be "mechanical" properties, such as material used, dimensions, and weight. For yet an additional example, the look and feel of the device can be a "resale value", such as an average historical price amortization, or any other information of interest that is correlated and compiled by the platform to characterize the item offered by the Seller.

Buyer receives information about Seller, such as rating, volume of sales, location, etc. Seller receives information about Buyer, such as capacity to purchase item, location, and age group. Based on augmented reality data about the product for sale presented to the prospective Buyer, the buyer can either accept the Seller asking price as listed by the Platform or propose a different price than the one listed. In addition, the platform correlation systems can make a suggestion for up or down price adjustments to the Seller and/or Buyer based on historical analysis of similar products sold on the platform overtime, with similar conditions. The platform can be integrated to banks, credits cards, payment gateway for direct payment.

Seller and Multiple Buyers use case is multiple registered users of the platform, functioning as in multiple buyers and one seller, participate in an online auction house scenario following the creation and posting of a product published by the augmented reality platform. Seller uploads the description and assets of a particular product to auction, specifying the conditions for the auction to be run by the platform within the augmented reality application. Constraints can include temporal limits, reserve price, geographic limits, criteria for acceptable buyers, advertising limits such as private by invitation only or public, etc. Platform hosts, advertises, and manages the auction. Platform hosts the auction while controlling the conditions to access the auction based on the Seller specifications.

Seller may joins the auction as its official Auctioneer, announcing the reserve price for the auctioned item, waiting for bids from the online buyers and replying to specific requests from the online buyers asking for more information. Alternatively, a platform auction agent may run the auction as the official auctioneer in case Seller is declining to play that role. The automated auctioneer can be rule based or governed by artificial intelligence (AI). Buyers joins the published auction via their augmented reading applications and submit bids or requests for more information to the Auctioneer. Auctioneer replies to requests for more information by for example focusing its augmented reality application on the item being auctioned. Buyer receives augmented reality information about the listed auctioned item as computed by platform back-end. The information is displayed by the mobile application and overlaid on top of the live feed uploaded from the Seller augmented reality connected device. Buyer can direct the Auctioneer to focus on the "look and feel" of the auctioned item, such as its left, right, top, bottom or inside (if it opens), or its "operational" status, such as turn it on, run a specific application (if item runs applications), or its "design", such as color or specific ornamental features, or its "mechanical" properties, such as material used, dimensions, weight, or any other information of interest that can be used by the platform to characterize the item offered by the Auctioneer. Augmented reality data displayed in real-time to all Buyers can be different depending if the Seller is the Auctioneer. If so, the Auctioneer is single handily replaying to incoming to all requests in a serial manner. If the platform AI is the Auctioneer, the platform AI can reply to all incoming requests in parallel.

Based on augmented reality data about the auctioned product presented to the prospective Buyer, the buyer can either bid or not to the Auctioneer asking price within the auction house parameters. Auctioneer receives information about Buyers, such as highest bidder, capacity to purchase item, location, age group, etc. Buyers receive augmented reality data about auctioned item as processed by platform and displayed by the mobile application, including possible visual representation of a virtual digital Auction House, complete with an avatar of the Auctioneer, multiple avatars of online bidders and with the auctioned item. Platform can be integrated with banks, credits cards, payment gateway for immediate payment.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method of augmenting eCommerce with quasi in-person discovery, the method performed by one or more processors, comprising:
    presenting, to a buyer on a buyer user interface provided by at least one buyer user device, an eCommerce opportunity associated with a tangible object that is offered by a seller via a seller user device; wherein the tangible object contains a visual aspect;
    receiving a requested visual aspect from a trusted agent coupled to the seller user device, wherein the trusted agent coupling is an electronic coupling comprising at least one of a biometric validation, geographic location, or seller user device identification;
    providing an interactive control affordance on the buyer user interface that enables the buyer to select for presentation another visual aspect of the tangible object;
    certifying that the requested visual aspect is a directed live recording by the seller user device based at least in part upon corroboration performed by the trusted agent;
    recognizing, by an augmented reality component of the at least one buyer user device, a discovered attribute of the other visual aspect of the tangible object;
    accessing information related to the discovered attribute that is pertinent to the eCommerce opportunity;
    presenting, to the buyer on the buyer user interface, an augmented reality informational item associated with the discovered attribute;
    presenting a current auction bid price of an auction on the user interface of the buyer and on at least one other user interface of other buyers;
    updating the current auction bid price based upon an input from either the user interface of the buyer or of the at least one other user interface of other buyers;
        wherein an automated auctioneer utility responds to inquiries and auction bid prices submitted via the user interface of the buyer and the at least one other user interface of the other buyers; and
    concluding the auction in response to another input via a seller user interface of the seller user device.

2. The method of claim 1, wherein providing the interactive control affordance comprises:
    communicating to the seller user device a requested visual aspect of the tangible object; and
    receiving an output from a camera of the seller user device that is directed toward the requested visual aspect including the discovered attribute.

3. The method of claim 1, wherein providing the interactive control affordance on the buyer user interface that enables the buyer to select for presentation another visual aspect of the tangible object that is provided by the seller user device comprises:
    directing, by an eCommerce platform, the seller to operate the seller user device to provide the requested visual aspect of a selected one of: (i) a video stream; and (ii) an images;
    storing the requested visual aspect; and
    in response to receiving activation of the interactive control affordance:
        replaying a requested portion of the stored visual aspect to the buyer, and
        certifying to the buyer that the requested aspect was obtained through the seller user device.

4. The method of claim 1, further comprising:
    receiving the requested visual aspect from the trusted agent coupled to the seller user device;
    rendering two dimensional image content into a three-dimensional model; and
    enabling the buyer user device to manipulate the three-dimensional model in vantage point and zoom.

5. The method of claim 1, further comprising:
    presenting the augmented reality informational item with a first annotation to indicate a trusted source other than the seller; and
    presenting the discovered attribute with a second annotation to indicate sourcing by the seller.

6. The method of claim 1, further comprising:
    presenting the discovered attribute via a first user interface device to indicate sourcing by the seller; and
    presenting the augmented reality informational item via a second user interface device comprising a heads up display through which the first user interface device is viewed.

7. The method of claim 1, further comprising:
    presenting on the buyer user interface one or more attributes of the seller that are related to credibility to effect a transaction; and
    presenting on the seller user interface one or more attributes of the buyer that are related to credibility to effect the transaction.

8. The method of claim 1, further comprising:
    presenting on the buyer user interface an offered sales price by the seller;
    providing a control affordance on the buyer user interface to counteroffer a sale price by the buyer to the seller; and
    presenting any counteroffer by the buyer on the seller user interface.

9. A system comprising:
    a processor;
    a memory that stores executable instructions that, when executed by the processor, cause the processor to provide:
    a data catalog that presents, to a buyer on a buyer user interface provided by at least one buyer user device, an eCommerce opportunity associated with a tangible object that is offered by a seller via a seller user device; wherein the tangible object contains a visual aspect, and upon selection, receiving a requested visual aspect from a trusted agent coupled to the seller user device, wherein the trusted agent coupling is an electronic coupling comprising at least one of a biometric validation, geographic location, or seller user device identification;

a data visualization and content distribution platform that provides an interactive control affordance on the buyer user interface that enables the buyer to select for presentation and request another visual aspect of the tangible object;
   wherein the trusted agent certifies that the requested another visual aspect is a directed live recording by the seller user device based at least in part upon corroboration performed by the trusted agent;
an augmented reality component that: (i) recognizes a discovered attribute of the other visual aspect of the tangible object; and (ii) accesses information related to the discovered attribute that is pertinent to the eCommerce opportunity;
an eCommerce platform that determines whether the user interface of the buyer includes an augmented reality heads up display (HUD), and
   in response to determining that the user interface does include the augmented reality HUD, presents the discovered attribute via a first user interface device to indicate sourcing by the seller, and presents an augmented reality informational item via a second user interface device comprising a heads up display through which the first user interface device is viewed;
   in response to determining that the user interface does not include the augmented reality HUD, presents the augmented reality informational item with a first annotation to indicate a trusted source other than the seller, and presents the discovered attribute with a second annotation to indicate sourcing by the seller; and
the data visualization and content distribution platform that presents, to the buyer on the buyer user interface, the augmented reality informational item associated with the discovered attribute.

10. The system of claim 9, further comprising a communication component that (i) receives a user input to the interactive control affordance via the buyer user device; (ii) communicates to the seller user device a requested visual aspect of the tangible object; and (iii) receives an output from a camera of the seller user device that is directed toward the requested visual aspect including the discovered attribute.

11. The system of claim 10,
wherein the communication component provides the interactive control affordance on the buyer user interface that enables the buyer to select for presentation another visual aspect of the tangible object that is provided by the seller user device; and further wherein:
the eCommerce platform:
   directs, via the communication component, the seller to operate the seller user device to provide the requested visual aspect of a selected one of: (i) a video stream; and (ii) an images;
   stores the requested visual aspect; and
   in response to receiving activation of the interactive control affordance:
      replays a requested portion of the stored visual aspect to the buyer, and
      certifies to the buyer that the requested visual aspect was obtained through the seller user device.

12. The system of claim 11, wherein the eCommerce platform:
presents on the buyer user interface one or more attributes of the seller that are related to credibility to effect a transaction; and
presents on a seller user interface of the seller user device one or more attributes of the buyer that are related to credibility to effect the transaction.

13. The system of claim 11, wherein the eCommerce platform:
determines whether the eCommerce opportunity comprises a selected one of: (i) a single buyer negotiation; and (ii) a multiple buyer auction;
in response to determining that the eCommerce opportunity is the single buyer negotiation:
   presents on the buyer user interface an offered sales price by the seller;
   provides a control affordance on the buyer user interface to counteroffer a sale price by the buyer to the seller; and
   presents any counteroffer by the buyer to a selected one of: (i) an automated auctioneer that is enabled to adjust a sales price; and (ii) a seller user interface of the seller user device for acceptance by the seller; and
in response to determining that the eCommerce opportunity is the multiple buyer auction:
   present a current auction bid price on the user interface of the buyer and on at least one other user interface of other buyers;
   update the current auction bid price based upon a separate input from either the user interface of the at least one other user interface; and
   conclude the multiple buyer auction in response to a selected one of: (i) the automated auctioneer closing bidding; and (ii) a seller input received via the seller user interface.

14. The system of claim 10, further comprising a compute platform that: (i) receives the requested visual aspect from the trusted agent coupled to the seller user device; (ii) renders two dimensional image content into a three-dimensional model; and (iii) provides the three-dimensional model to the data visualization and content distribution platform that enables the buyer user device to manipulate the three-dimensional model in vantage point and zoom.

15. A non-transitory computer-readable storage medium comprising computer-executable instructions, which when executed via a processing unit on a computer performs acts, comprising:
presenting, to a buyer on a buyer user interface provided by at least one buyer user device, an eCommerce opportunity associated with a tangible object that is offered by a seller via a seller user device; wherein the tangible object contains a visual aspect,
upon buyer requesting the visual aspect, receiving the requested visual aspect from a trusted agent coupled to the seller user device, wherein the trusted agent coupling is an electronic coupling comprising at least one of a biometric validation, geographic location, or seller user device identification;
providing an interactive control affordance on the buyer user interface that enables the buyer to select for presentation another visual aspect of the tangible object;
certifying that the requested visual aspect is a directed live recording by the seller user device based at least in part upon corroboration performed by the trusted agent;
recognizing, by an augmented reality component of the at least one buyer user device, a discovered attribute of the other visual aspect of the tangible object;
accessing information related to the discovered attribute that is pertinent to the eCommerce opportunity;

presenting, to the buyer on the buyer user interface, an augmented reality informational item associated with the discovered attribute;

presenting a current auction bid price of an auction on the user interface of the buyer and on at least one other user interface of other buyers;

updating the current auction bid price based upon an input from either the user interface of the buyer or of the at least one other user interface of other buyers;

wherein an automated auctioneer utility responds to inquiries and auction bid prices submitted via the user interface of the buyer and the at least one other user interface of the other buyers; and concluding the auction in response to another input via the seller user interface of the seller user device.

* * * * *